US009828896B2

(12) United States Patent
Swallow et al.

(10) Patent No.: US 9,828,896 B2
(45) Date of Patent: Nov. 28, 2017

(54) EXHAUST SYSTEM WITH A MODIFIED LEAN $NO_x$ TRAP

(71) Applicant: Johnson Matthey Public Limited Company, London (GB)

(72) Inventors: Daniel Swallow, Sandy (GB); Stuart David Reid, Cambourne (GB); Paul Richard Phillips, Royston (GB); James Alexander Wylie, Royston (GB)

(73) Assignee: Johnson Matthey Public Limited Company, London (GB)

( * ) Notice: Subject to any disclaimer, the term of this patent is extended or adjusted under 35 U.S.C. 154(b) by 178 days.

(21) Appl. No.: 14/820,581

(22) Filed: Aug. 7, 2015

(65) Prior Publication Data

US 2016/0047286 A1  Feb. 18, 2016

Related U.S. Application Data

(60) Provisional application No. 62/036,184, filed on Aug. 12, 2014.

(51) Int. Cl.
| | |
|---|---|
| *B01D 53/94* | (2006.01) |
| *F01N 3/10* | (2006.01) |
| *F01N 3/18* | (2006.01) |
| *F01N 3/20* | (2006.01) |
| *F01N 3/08* | (2006.01) |
| *B01J 35/00* | (2006.01) |
| *B01J 21/00* | (2006.01) |
| *B01J 23/63* | (2006.01) |

(52) U.S. Cl.
CPC ....... *F01N 3/0842* (2013.01); *B01D 53/9422* (2013.01); *B01D 53/9477* (2013.01); *B01J 21/005* (2013.01); *B01J 23/63* (2013.01); *B01J 35/0006* (2013.01); *F01N 3/0814* (2013.01); *F01N 3/103* (2013.01); *F01N 3/2066* (2013.01); *B01D 2251/2067* (2013.01); *B01D 2255/1021* (2013.01); *B01D 2255/1023* (2013.01); *B01D 2255/2042* (2013.01); *B01D 2255/2065* (2013.01); *B01D 2255/405* (2013.01); *B01D 2255/50* (2013.01); *B01D 2255/9022* (2013.01); *B01D 2255/9032* (2013.01); *B01D 2255/91* (2013.01); *F01N 2570/14* (2013.01); *F01N 2610/02* (2013.01); *Y02T 10/24* (2013.01)

(58) Field of Classification Search
CPC .. F01N 3/2066; F01N 2610/02; F01N 3/0814; F01N 3/0842; F01N 3/103; F01N 2570/14; B01D 2255/91; B01D 53/9422; B01D 53/9477; B01D 2251/2067; B01D 2255/1021; B01D 2255/1023; B01D 2255/2042; B01D 2255/2065; B01D 2255/405; B01D 2255/50; B01D 2253/9022; B01D 2255/9032; Y02T 10/24; B01J 35/0006; B01J 21/005; B01J 23/63
See application file for complete search history.

(56) References Cited

U.S. PATENT DOCUMENTS

| | | | | |
|---|---|---|---|---|
| 8,158,067 | B2 * | 4/2012 | Choi | B01D 53/9477 422/171 |
| 9,498,775 | B2 * | 11/2016 | Zheng | B01J 37/0244 |
| 9,550,176 | B2 * | 1/2017 | Sato | B01J 37/03 |
| 9,566,573 | B2 * | 2/2017 | Baba | F01N 3/2828 |
| 2009/0320457 | A1 | 12/2009 | Wan | |
| 2010/0233045 | A1 * | 9/2010 | Kim | B01D 53/944 422/177 |
| 2011/0005200 | A1 | 1/2011 | Gandhi et al. | |
| 2012/0240554 | A1 | 9/2012 | Qi et al. | |
| 2014/0047819 | A1 * | 2/2014 | Wan | B01D 53/9472 60/274 |
| 2015/0273452 | A1 * | 10/2015 | Chiffey | B01D 53/9422 423/213.5 |
| 2016/0121266 | A1 * | 5/2016 | Nagoshi | F01N 3/2066 423/239.1 |

FOREIGN PATENT DOCUMENTS

| | | | | |
|---|---|---|---|---|
| CN | 105263620 A | * | 1/2016 | ........... F01N 3/2828 |
| DE | 102012204524 A1 | * | 10/2012 | ........ B01D 53/9422 |
| EP | 0931590 A1 | | 7/1999 | |
| EP | 1027919 A2 | | 8/2000 | |
| GB | 2522556 A | | 7/2015 | |
| JP | 2013146693 A | | 8/2013 | |
| WO | 0222241 A1 | | 3/2002 | |
| WO | 2004076829 A1 | | 9/2004 | |
| WO | 2008047170 A1 | | 4/2008 | |

(Continued)

*Primary Examiner* — Timothy Vanoy
(74) *Attorney, Agent, or Firm* — Jimmie Johnson

(57) ABSTRACT

An exhaust system for treating an exhaust gas from an internal combustion engine is disclosed. The system comprises a modified lean $NO_x$ trap (LNT), a urea injection system, and an ammonia-selective catalytic reduction catalyst. The modified LNT comprises a first layer and a second layer. The first layer comprises a $NO_x$ adsorbent component and one or more platinum group metals. The second layer comprises a diesel oxidation catalyst zone and an NO oxidation zone. The diesel oxidation catalyst zone comprises a platinum group metal, a zeolite, and optionally an alkaline earth metal. The NO oxidation zone comprises a platinum group metal and a carrier. The modified LNT stores $NO_x$ at temperatures below about 200° C. and releases at temperatures above about 200° C. The modified LNT and a method of using the modified LNT are also disclosed.

19 Claims, 2 Drawing Sheets

(56) References Cited

FOREIGN PATENT DOCUMENTS

WO     WO 2013151557 A1 * 10/2013   .......... B01J 37/0244
WO         2014036797 A1     3/2014

* cited by examiner

NOx storage and release over NEDC testing with no rich purging

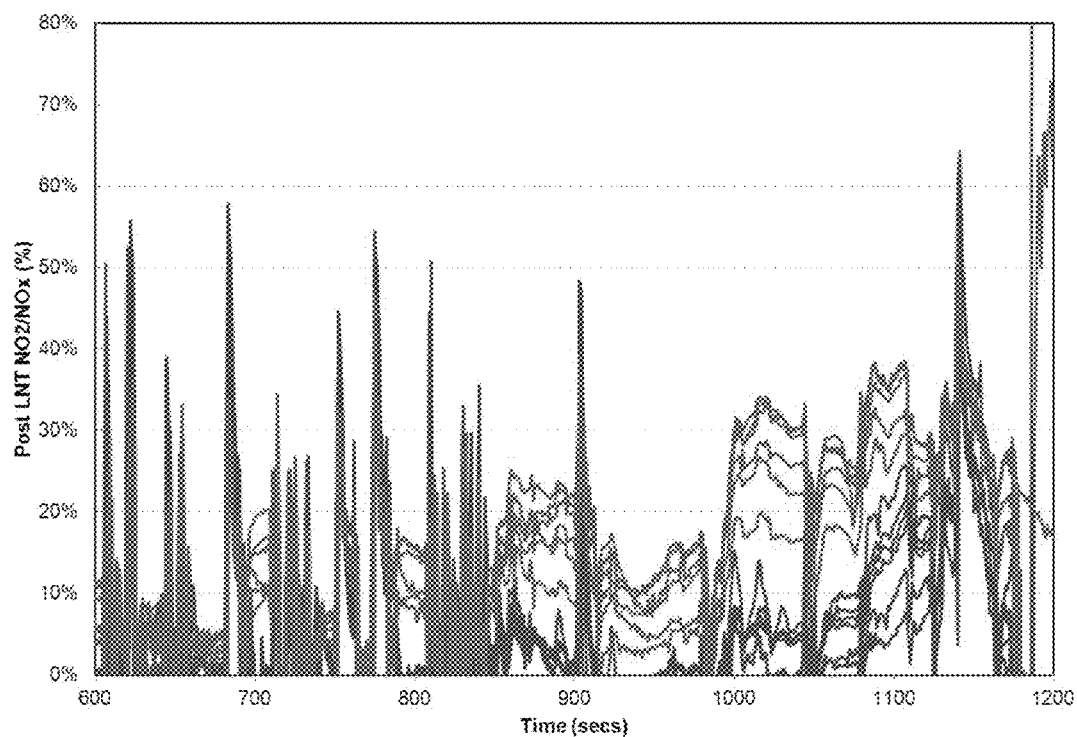

US 9,828,896 B2

EXHAUST SYSTEM WITH A MODIFIED LEAN $NO_x$ TRAP

CROSS-REFERENCE TO RELATED APPLICATION

This application claims priority benefit to U.S. Provisional Patent Application No. 62/036,184 filed on Aug. 12, 2014, which is incorporated herein by reference.

FIELD OF THE INVENTION

The invention relates to an exhaust system for treating an exhaust gas from an internal combustion engine, and a method for treating exhaust gas from internal combustion engines.

BACKGROUND OF THE INVENTION

Internal combustion engines produce exhaust gases containing a variety of pollutants, including nitrogen oxides ("$NO_x$"), carbon monoxide, and uncombusted hydrocarbons, which are the subject of governmental legislation. Emission control systems are widely utilized to reduce the amount of these pollutants emitted to atmosphere, and typically achieve very high efficiencies once they reach their operating temperature (typically, 200° C. and higher). However, these systems are relatively inefficient below their operating temperature (the "cold start" period).

For instance, current urea based selective catalytic reduction (SCR) applications implemented for meeting Euro 6b emissions require that the temperature at the urea dosing position be above about 180° C. before urea can be dosed and used to convert $NO_x$. $NO_x$ conversion below 180° C. is difficult to address using the current systems, and future European and US legislation will stress the low temperature $NO_x$ storage and conversion. Currently this is achieved by heating strategies but this has a detrimental effect of $CO_2$ emissions.

As even more stringent national and regional legislation lowers the amount of pollutants that can be emitted from diesel or gasoline engines, reducing emissions during the cold start period is becoming a major challenge. Thus, methods for reducing the level of $NO_x$ emitted during cold start condition continue to be explored.

For instance, PCT Intl. Appl. WO 2008/047170 discloses a system wherein $NO_x$ from a lean exhaust gas is adsorbed at temperatures below 200° C. and is subsequently thermally desorbed above 200° C. The $NO_x$ adsorbent is taught to consist of palladium and a cerium oxide or a mixed oxide or composite oxide containing cerium and at least one other transition metal.

U.S. Appl. Pub. No. 2011/0005200 teaches a catalyst system that simultaneously removes ammonia and enhances net $NO_x$ conversion by placing an ammonia-selective catalytic reduction ("$NH_3$-SCR") catalyst formulation downstream of a can $NO_x$ trap. The $NH_3$-SCR catalyst is taught to adsorb the ammonia that is generated during the rich pulses in the lean $NO_x$ trap. The stored ammonia then reacts with the $NO_x$ emitted from the upstream lean $NO_x$ trap, which increases $NO_x$ conversion rate while depleting the stored ammonia.

PCT Intl. Appl. WO 2004/076829 discloses an exhaust-gas purification system which includes a $NO_x$ storage catalyst arranged upstream of an SCR catalyst. The $NO_x$ storage catalyst includes at least one alkali, alkaline earth, or rare earth metal which is coated or activated with at least one platinum group metal (Pt, Pd, Rh, or Ir). A particularly preferred $NO_x$ storage catalyst is taught to include cerium oxide coated with platinum and additionally platinum as an oxidizing catalyst on a support based on aluminum oxide. EP 1027919 discloses a $NO_x$ adsorbent material that comprises a porous support material, such as alumina, zeolite, zirconia, titania, and/or lanthana, and at least 0.1 wt % precious metal (Pt, Pd, and/or Rh). Platinum carried on alumina is exemplified.

As with any automotive system and process, it is desirable to attain still further improvements in exhaust gas treatment systems, particularly under cold start conditions. We have discovered a system that can reduce $NO_x$ emissions during the cold start period, while maintaining good CO oxidation activity and showing resistance to deactivation by sulfation.

SUMMARY OF THE INVENTION

The invention is an exhaust system for treating an exhaust gas from an internal combustion engine. The system comprises a modified lean $NO_x$ trap (LNT), a urea injection system, and an ammonia-selective catalytic reduction ($NH_3$-SCR) catalyst. The modified LNT comprises a first layer and a second layer. The first layer comprises a $NO_x$ adsorbent component and one or more platinum group metals. The second layer comprises a diesel oxidation catalyst zone and a NO oxidation zone. The diesel oxidation catalyst zone comprises a platinum group metal, a zeolite, and optionally an alkaline earth metal. The NO oxidation zone comprises a platinum group metal and a carrier. The modified LNT stores $NO_x$ at temperatures below about 200° C. and releases at temperatures above about 200° C. The invention also includes the modified LNT and a method of using the modified LNT.

BRIEF DESCRIPTION OF THE DRAWINGS

FIG. 2 shows the improved concentration of $NO_2/NO_x$ ratio for a LNT that comprises a diesel oxidation catalyst zone and a NO oxidation zone over a first layer that comprises a $NO_x$ adsorbent.

DETAILED DESCRIPTION OF THE INVENTION

Figure 1:
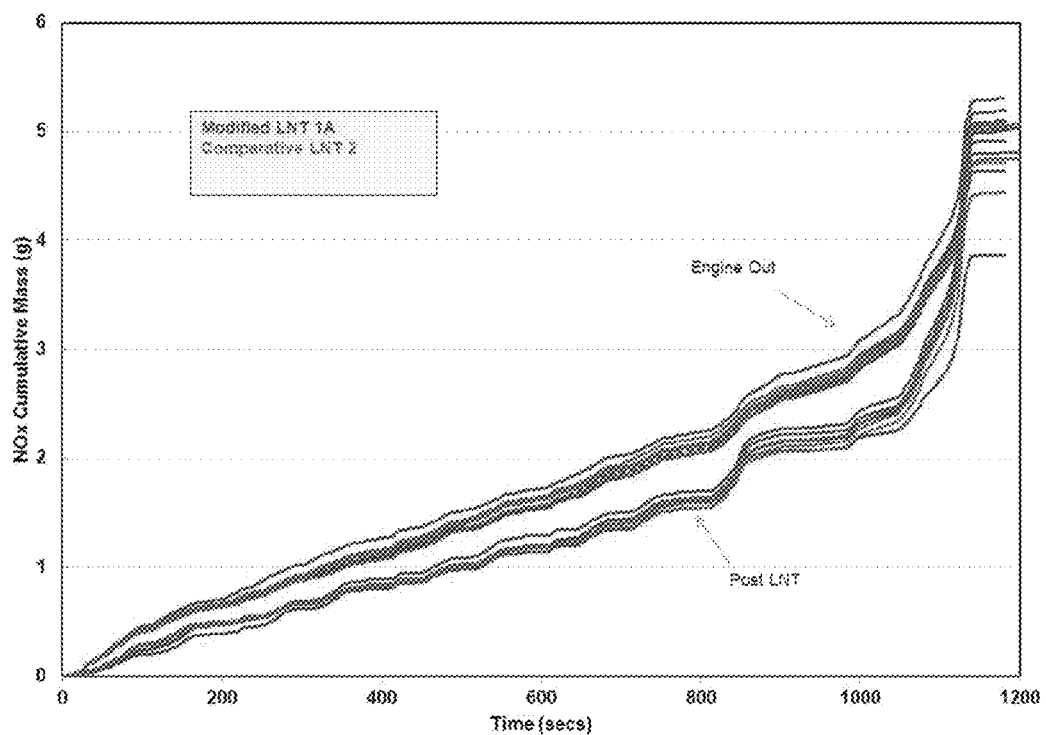
FIG. 1 shows the cumulative $NO_x$ from engine testing with the modified LNT.

The invention is an exhaust system for treating an exhaust gas from an internal combustion engine. The system comprises a modified lean $NO_x$ trap (LNT). Lean $NO_x$ traps are well known in the art. Lean $NO_x$ trap are typically designed to adsorb $NO_x$ under lean exhaust conditions, release the adsorbed $NO_x$ under rich conditions, and reduce the released $NO_x$ to form $N_2$.

LNTs typically include a $NO_x$-storage component, an oxidation component, and a reduction component. The $NO_x$-storage component preferably comprises alkaline earth metals (such as barium, calcium, strontium, and magnesium), alkali metals (such as potassium, sodium, lithium, and cesium), rare earth metals (such as lanthanum, yttrium, praseodymium and neodymium), or combinations thereof. These metals are typically found in the form of oxides. Typically, platinum is included to perform the oxidation function and rhodium is included to perform the reduction function. These components are contained on one or more supports.

The oxidation/reduction catalyst and the $NO_x$-storage component are preferably loaded on a support material such as an inorganic oxide to form an LNT for use in the exhaust system.

The modified LNT of the invention is designed to have a different function than known LNTs, in that they are preferably designed to store $NO_x$ at temperatures below about 200° C. and release the stored $NO_x$ at temperatures above about 200° C. The release of stored $NO_x$ may be brought about thermally or may also be brought about by a rich purge.

The modified LNT comprises a first layer and a second layer. The first layer comprises a $NO_x$ adsorbent component and one or more platinum group metals. The $NO_x$ adsorbent component preferably comprises an alkaline earth metal, an alkali metal, a rare earth metal, and mixtures thereof. The alkaline earth metal is preferably barium, calcium, strontium, or magnesium. The alkali metal is preferably potassium, sodium, lithium, or cesium. The rare earth metal is preferably lanthanum, yttrium, praseodymium, or neodymium. Most preferably, the $NO_x$ adsorbent component comprises barium.

If utilized, the alkaline earth metal, alkali metal, rare earth metal, or mixtures thereof may preferably be supported on inorganic oxide. The inorganic oxide material is preferably a ceria-containing material or a magnesia-alumina. The ceria-containing material is preferably ceria, ceria-zirconia, ceria-zirconia-alumina, or mixtures thereof. More preferably, the ceria-containing material is ceria, and in particular, particulate ceria. The magnesia-alumina is preferably a spinel, a magnesia-alumina mixed metal oxide, a hydrotalcite or hydrotalcite-like material, and combinations of two or more thereof. More preferably, the magnesia-alumina support is a spinel.

The alkaline earth metal, an alkali metal, or a rare earth metal component may be loaded onto the inorganic oxide material by any known means, the manner of addition is not considered to be particularly critical. For example, a barium compound (such as barium acetate) may be added to a ceria-containing material by impregnation, adsorption, ion-exchange, incipient wetness, precipitation, or the like. Preferably, the first layer comprises at least 2.5 weight percent barium.

The platinum group metal is preferably platinum, palladium, rhodium, or mixtures. Platinum and palladium are particularly preferred.

Preferably, the first layer also comprises a support. The support is preferably an oxide of Groups 2, 3, 4, 5, 13 and 14 elements. Most preferably, the support is an alumina, silica, titania, zirconia, magnesia, niobia, tantalum oxide, molybdenum oxide, tungsten oxide, a mixed oxide or composite oxide of any two or more thereof, and mixtures thereof. Preferred supports preferably have surface areas in the range 10 to 1500 $m^2/g$, pore volumes in the range 0.1 to 4 mL/g, and pore diameters from about 10 to 1000 Angstroms. High surface area supports having a surface area greater than 80 $m^2/g$ are particularly preferred.

The second layer comprises a diesel oxidation catalyst zone and an NO oxidation zone. The diesel oxidation catalyst zone comprises a platinum group metal, a zeolite, and optionally an alkaline earth metal. The optional alkaline earth metal is preferably magnesium, calcium, strontium, or barium; more preferably, barium. The platinum group metal preferably comprises platinum and palladium. Preferably, the Pd:Pt ratio in the diesel oxidation catalyst zone ranges from 0.25 to 1.

The zeolite may be any natural or a synthetic zeolite, and is preferably composed of aluminum, silicon, and/or phosphorus. The zeolites typically have a three-dimensional arrangement of $SiO_4$, $AlO_4$, and/or $PO_4$ that are joined by the sharing of oxygen atoms, but may also be two-dimensional structures as well. The zeolite frameworks are typically anionic, which are counterbalanced by charge compensating cations, typically alkali and alkaline earth elements (e.g., Na, K, Mg, Ca, Sr, and Ba), ammonium ions, and also protons.

Preferably, the zeolite is selected from an aluminosilicate zeolite, a metal-substituted aluminosilicate zeolite, an aluminophosphate zeolite, a metal-substituted aluminophosphate zeolite, a silicoaluminophosphate zeolite, or a metal-substituted silicoaluminophosphate zeolite. Zeolites having a Framework Type of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON, MFI, FER, MWW, EUO, CON, BEA, FAU, MOR, and EMT, as well as mixtures or intergrowths of any two or more, are particularly preferred. Most preferably, the zeolite has a Framework Type of an AEI, a CHA, a LEV, a BEA (e.g., beta zeolite), a FAU (e.g, zeolite Y), or MFI (e.g., ZSM-5).

The diesel oxidation catalyst may also preferably comprise manganese.

The diesel oxidation catalyst zone preferably also comprises an inorganic oxide support. The inorganic oxide support preferably includes oxides of Groups 2, 3, 4, 5, 13 and 14 elements. Most preferably, the support is an alumina or silica-doped alumina support.

The NO oxidation zone comprises a platinum group metal and a carrier. The platinum group metal preferably comprises platinum and palladium. Preferably, the Pd:Pt ratio in the NO oxidation zone ranges from 0 to 0.25. The carrier is preferably alumina, silica, a ceria-containing material, titania, zirconia, magnesia, niobia, tantalum oxide, molybdenum oxide, tungsten oxide, a mixed oxide or composite oxide of any two or more thereof (e.g. silica-alumina, magnesia-alumina), and mixtures thereof. The ceria-containing material is preferably ceria, ceria-zirconia, ceria-zirconia-alumina, or mixtures thereof; and more preferably, the ceria-containing material is ceria, and in particular, particulate ceria. Mixtures of carriers such as alumina and ceria are particularly preferred. The NO oxidation zone may also preferably comprise manganese. The NO oxidation zone may contain an alkali metal or alkaline earth metal such as barium, but may also be substantially free of an alkali metal or alkaline earth metal component. By "substantially free", it is meant that no alkali metal or alkaline earth metal is deliberately added to the NO oxidation zone. Preferably, "substantially free" means that the NO oxidation zone contains less than 0.1 weight percent alkali metal or alkaline earth metal, more preferably less than 0.05 weight percent alkali metal or alkaline earth metal, and most preferably no alkali metal or alkaline earth metal.

The modified LNT preferably includes a substrate. The substrate is preferably a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

The metallic substrate may be made of any suitable metal, and in particular heat-resistant metals and metal alloys such as titanium and stainless steel as well as ferritic alloys containing iron, nickel, chromium, and/or aluminum in addition to other trace metals.

The substrate is preferably a flow-through substrate or a filter substrate. Most preferably, the substrate is a flow-through substrate. In particular, the flow-through substrate is a flow-through monolith preferably having a honeycomb structure with many small, parallel thin-walled channels running axially through the substrate and extending throughout the substrate. The channel cross-section of the substrate may be any shape, but is preferably square, sinusoidal, triangular, rectangular, hexagonal, trapezoidal, circular, or oval.

When added to the substrate, the layers of the modified $NO_x$ trap may be arranged on the substrate in any order, but preferably the first layer is disposed on the substrate, and the second layer is disposed on the first layer. The diesel oxidation catalyst zone of the second layer is preferably arranged upstream of the NO oxidation zone so that the exhaust gas first contacts the diesel oxidation catalyst zone prior to contacting the NO oxidation zone.

The modified $NO_x$ trap of the present invention may be prepared by processes well known in the prior art. Preferably, the $NO_x$ trap is prepared by depositing the two layers on the substrate using washcoat procedures.

Preferably, the entire length of the substrate is coated with the first layer slurry so that a washcoat of the first layer covers the entire surface of the substrate. A portion of the length of the substrate from the front end is coated with the diesel oxidation catalyst zone, while the remainder of the substrate length is coated with the NO oxidation zone.

The modified LNT of the invention stores $NO_x$ at temperatures below about 200° C. and releases the stored $NO_x$ at temperatures above about 200° C.

The exhaust system of the invention also comprises an ammonia-selective catalytic reduction ($NH_3$-SCR) catalyst. The $NH_3$-SCR catalyst may comprise any known $NH_3$-SCR catalysts, which are well-known in the art. A $NH_3$-SCR catalyst is a catalyst that reduces $NO_x$ to $N_2$ by reaction with nitrogen compounds (such as ammonia or urea).

Preferably, the $NH_3$-SCR catalyst is comprised of a vanadia-titania catalyst, a vanadia-tungsta-titania catalyst, or a metal/zeolite catalyst. The metal/zeolite catalyst comprises a metal and a zeolite. Preferred metals include iron and copper.

The zeolite may be any natural or a synthetic zeolite, and is preferably composed of aluminum, silicon, and/or phosphorus. The zeolites typically have a three-dimensional arrangement of $SiO_4$, $AlO_4$, and/or $PO_4$ that are joined by the sharing of oxygen atoms, but may also be two-dimensional structures as well. The zeolite frameworks are typically anionic, which are counterbalanced by charge compensating cations, typically alkali and alkaline earth elements (e.g., Na, K, Mg, Ca, Sr, and Ba), ammonium ions, and also protons.

Preferably, the zeolite is selected from an aluminosilicate zeolite, a metal-substituted aluminosilicate zeolite, an aluminophosphate zeolite, a metal-substituted aluminophosphate zeolite, a silicoaluminophosphate zeolite, or a metal-substituted silicoaluminophosphate zeolite. Zeolites having a Framework Type of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON, MFI, FER, MWW, EUO, CON, BEA, FAU, MOR, and EMT, as well as mixtures or intergrowths of any two or more, are particularly preferred. Most preferably, the zeolite has a Framework Type of an AEI, a CHA, a LEV, a BEA (e.g., beta zeolite), or a FER (e.g, ferrierite).

The $NH_3$-SCR catalyst is preferably coated on a ceramic or a metallic substrate, as described above. The substrate is typically designed to provide a number of channels through which vehicle exhaust passes, and the surface of the channels will be preferably be coated with the $NH_3$-SCR catalyst.

The substrate for the $NH_3$-SCR catalyst may be a filter substrate or a flow-through substrate. Preferably, the $NH_3$-SCR catalyst is coated onto a filter, which is known as an ammonia-selective catalytic reduction filter ($NH_3$-SCRF). SCRFs are single-substrate devices that combine the functionality of an $NH_3$-SCR and particulate filter. They are used to reduce $NO_x$ and particulate emissions from internal combustion engines.

The system of the invention further comprises a urea injection system. The urea injection system preferably comprises a urea injector that injects urea into the exhaust gas stream upstream of the $NH_3$-SCR catalyst and downstream of the modified LNT. The urea injection system will preferably consist of a nozzle to produce well defined droplets of urea solution. The droplet size is preferably less than 500 microns to allow rapid evaporation and urea decomposition. The injector pressure and pump rate will be such to allow effective mixing in the exhaust gas stream.

The urea injection system will also preferably consist of a urea tank, transfer lines and possibly a heating system to avoid freezing of the urea solution.

Preferably, the urea injection system injects urea at temperatures above about 180° C.

The invention also includes a method for treating an exhaust gas from an internal combustion engine. The method comprises passing the exhaust gas over the modified LNT described above. The modified LNT removes oxides of nitrogen ($NO_x$) from the exhaust gas at temperatures below about 200° C., and releases the $NO_x$ at temperatures above about 200° C. At temperatures above about 180° C., urea is injected into the exhaust gas downstream of the modified LNT, and the exhaust gas containing released $NO_x$ from the modified LNT and urea is passed over a $NH_3$-SCR catalyst. The released $NO_x$ is converted to nitrogen by the reaction of ammonia (generated from urea) with $NO_x$ over the $NH_3$-SCR catalyst. The released $NO_x$ is the $NO_x$ that is stored on the modified LNT at low temperatures and is then released at the higher temperatures, and also includes $NO_x$ that is passes over the $NH_3$-SCR $NH_3$-SCR catalyst without being stored.

Preferably, the modified LNT is periodically subjected to a rich desulfation step. The presence of sulfur compounds in fuel may be detrimental to the modified LNT since the oxidation of sulfur compounds leads to sulfur oxides in the exhaust gas. In the LNT, sulfur dioxide can be oxidized to sulfur trioxide over the platinum group metals and form surface sulfates on the LNT surface (e.g., barium oxide or barium carbonate reacts with sulfur trioxide to form barium sulfate). These sulfates are more stable than the nitrates and require higher temperatures (>500° C.) to desulfate. If the modified LNT has a low barium content, a lower desulfation temperature may be useful.

In rich desulfation, the modified LNT is typically subjected to a temperature above about 500° C. in rich air:fuel ratio environment to accomplish sulfur removal. The desulfation is preferably performed by increasing exhaust temperatures through a post-injection of fuel. Desulfation strategies may include a single, continuous rich period, or a series of short rich air-to-fuel ratio pulses.

The following examples merely illustrate the invention. Those skilled in the art will recognize many variations that are within the spirit of the invention and scope of the claims.

EXAMPLE 1

Preparation of Modified LNTs

Modified LNT 1A

A 400 cell per square inch (cpsi) flow-through cordierite substrate monolith is coated with a $NO_x$ absorber catalyst formulation comprising two layers. The lower layer washcoat comprises Pt, Pd, 28% of a Ce/magnesium-aluminate spinel and 66% ceria (95% of the total ceria loading includes particulate ceria containing 7% Ba). The washcoat is coated on the virgin substrate monolith using the method disclosed in WO 99/47260, followed by drying for 30 minutes in a forced air drier at 100° C. and then firing at 500° C. for 2 hours.

A second slurry is prepared consisting of alumina slurried and milled to a $d_{90}$<20 micron followed by the addition of appropriate amounts of soluble platinum and palladium salts and particulate ceria to give 50% alumina and 50% particulate ceria. The second slurry is applied to the calcined lower layer via outlet channels. The part is dried and calcined at 500° C.

A third slurry is prepared consisting of a silica-doped alumina powder slurried in water and milled to a $d_{90}$<20 micron. Barium acetate is added to the slurry followed by appropriate amounts of soluble platinum and palladium salts. The slurry is then stirred for 30 minutes to homogenize before addition of beta-zeolite to give 81% doped silica alumina and 19% beta zeolite. The third slurry is applied to the calcined lower layer via the inlet channels. The part is dried and calcined at 500° C. to give a total PGM loading of 89 g/ft$^3$ Pt and 30 g/ft$^3$ Pd.

Comparative LNT 2

A 400 cells per square inch (cpsi) flow-through cordierite substrate monolith is coated with a $NO_x$ absorber catalyst formulation comprising a single layer that comprises Pt, Pd, a Ce/magnesium-aluminate spinel, a Ba coated particulate ceria, and contains 33% of the Ce/magnesium-aluminate spinel, 61% of ceria (93% of the total ceria loading includes particulate ceria containing 7% Ba), and 113 g/ft$^3$ of Pt and Pd. The washcoat is coated on the virgin substrate monolith using the method disclosed in WO 99/47260, followed by drying for 30 minutes in a forced air drier at 100° C. and then firing at 500° C. for 2 hours.

EXAMPLE 2

Engine Testing

Modified LNT 1A and Comparative LNT 2 (1.4 L catalyst volume) are hydrothermally aged at 800° C. for 5 hours. Each LNT is pre-conditioned on a 1.6 liter engine employing low pressure exhaust gas recirculation (EGR), by running 4 NEDC cycles with a 5 s rich purge at lambda 0.95 on the 100 kph cruise. Evaluation is then carried out over the NEDC drive cycles on a 2.2 liter engine. No rich purging is employed during the evaluation.

The results show that the modified LNT 1A stores about 0.5 g $NO_x$ up to about 200° C., followed by near complete thermal release of the stored $NO_x$ from 200 to 300° C., showing that the modified LNT of the invention are capable of use with a $NH_3$-SCR system. FIG. 2 shows that the modified LNT 1A design increases post LNT $NO_2$/NOx ratio to 20-40% compared to 5-20% for the comparative LNT 2. Table 1 describes the tailpipe CO emissions with the modified LNT 1A showing much greater CO conversion and greatly improved stability to oxidative deactivation over 4 NEDC without rich purging. Table 2 describes the tailpipe HC emissions with the modified LNT 1A showing much greater HC conversion.

TABLE 1

Tailpipe CO emissions

| | CO tailpipe emissions (g) | |
|---|---|---|
| Test Run | Modified LNT 1A | Comparative LNT 2 |
| NEDC # 1 after rich pre-conditon | 2.40 | 3.73 |
| NEDC # 2 | 3.40 | 5.50 |
| NEDC # 3 | 3.57 | 6.51 |
| NEDC # 4 | 3.66 | 6.66 |

TABLE 2

Tailpipe HC emissions

| | HC tailpipe emissions (g) | |
|---|---|---|
| Test Run | Modified LNT 1A | Comparative LNT 2 |
| NEDC # 1 after rich pre-conditon | 0.44 | 0.63 |
| NEDC # 2 | 0.46 | 0.66 |
| NEDC # 3 | 0.47 | 0.74 |
| NEDC # 4 | 0.47 | 0.74 |

We claim:

1. An exhaust system for treating an exhaust gas from an internal combustion engine, comprising a modified lean $NO_x$ trap (LNT), a urea injection system, and an ammonia-selective catalytic reduction ($NH_3$-SCR) catalyst, wherein the modified LNT stores $NO_x$ at temperatures below about 200° C. and releases the stored $NO_x$ at temperatures above about 200° C. and the modified LNT comprises:

(a) a first layer comprising a $NO_x$ adsorbent component and one or more platinum group metals; and
    (b) a second layer comprising a diesel oxidation catalyst zone comprising a platinum group metal, a zeolite, and optionally an alkaline earth metal; and an NO oxidation zone comprising platinum group metal and a carrier.

2. The exhaust system of claim 1 wherein the urea injection system injects urea at temperatures above about 180° C.

3. The exhaust system of claim 1 wherein the $NO_x$ adsorbent component comprises an alkaline earth metal, an alkali metal, a rare earth metal, and mixtures thereof.

4. The exhaust system of claim 1 wherein the $NO_x$ adsorbent component comprises barium.

5. The exhaust system of claim 3 wherein the an alkaline earth metal, an alkali metal, a rare earth metal, and mixtures thereof is supported on an inorganic oxide material.

6. The exhaust system of claim 5 wherein the inorganic oxide material is a ceria-containing material or a magnesia-alumina.

7. The exhaust system of claim 1 wherein the one or more platinum group metals of the first layer is selected from the group consisting of palladium, platinum, rhodium, and mixtures thereof.

8. The exhaust system of claim 6 wherein the magnesia-alumina is a magnesium-aluminate spinel.

9. The exhaust system of claim 1 wherein the zeolite of the diesel oxidation catalyst zone is selected from the group of Framework Type consisting of an AEI, a CHA, a LEV, a BEA, a FAU, and MFI.

10. The exhaust system of claim 1 wherein the diesel oxidation catalyst zone further comprises an inorganic oxide support comprising an alumina or a silica-doped alumina.

11. The exhaust system of claim 1 wherein the carrier of the NO oxidation zone comprises alumina and cerin.

12. The exhaust system of claim 1 wherein the NO oxidation zone further comprises manganese.

13. The exhaust system of claim 1 wherein the $NH_3$-SCR catalyst is selected from the group consisting of a vanadia-titania catalyst, a vanadia-tungsta-titania catalyst, and a metal/zeolite.

14. The exhaust system of claim 13 wherein the metal/zeolite comprises a metal selected from the group consisting of iron or copper and a zeolite selected from the group of Framework Type consisting of an AEI, a CHA, a LEV, a BEA (e.g., beta zeolite), or a FER (e.g, ferrierite).

15. The exhaust system of claim 1 wherein the $NH_3$-SCR catalyst is an ammonia-selective catalytic reduction filter ($NH_3$-SCRF).

16. The exhaust system of claim 15 wherein the $NH_3$-SCRF comprises a filter having a $NH_3$-SCR catalyst selected from the group consisting of a vanadia-titania catalyst, a vanadia-tungsta-titania catalyst, and a metal/zeolite.

17. A modified lean $NO_x$ trap (LNT) comprising:
(a) a first layer comprising a $NO_x$ adsorbent component and one or more platinum group metals; and
(b) a second layer comprising a diesel oxidation catalyst zone comprising a platinum group metal, a zeolite, and optionally an alkaline earth metal; and an NO oxidation zone comprising platinum group metal and a carrier.

18. A method for treating exhaust gas from an internal combustion engine of a vehicle, comprising:
(a) passing the exhaust gas over the modified lean $NO_x$ trap (LNT) of claim 17 to remove oxides of nitrogen ($NO_x$) from the exhaust gas at temperatures below about 200° C. and release the $NO_x$ at temperatures above about 200° C.;
(b) injecting urea into the exhaust gas downstream of the modified LNT at temperatures above about 180° C.; and
(c) passing an exhaust gas containing released $NO_x$ from the modified LNT and urea over a $NH_3$-SCR catalyst to convert the $NO_x$ to nitrogen.

19. The method of claim 18 further comprising periodically subjecting the modified LNT to a temperature above about 500° C. in a rich air:fuel ratio environment to remove sulfur that has accumulated on the modified LNT.

* * * * *